Patented Apr. 8, 1930

1,753,816

UNITED STATES PATENT OFFICE

FRITZ ZSCHOCH AND HERBERT RODRIAN, OF UNTERROBLINGEN, GERMANY, ASSIGNORS TO A. RIEBECK'SCHE MONTANWERKE AKTIENGESELLSCHAFT, OF HALLE, SAALE, GERMANY

PRODUCTION OF MONTAN WAX

No Drawing. Application filed March 13, 1928, Serial No. 261,406, and in Germany September 16, 1927.

This invention relates to the production of Montan wax. This product as hitherto obtained by extracting bituminous coal, especially brown-coal, with organic solvents is of a dark-brown to black color whereby the possibilities of utilizing the product are lessened to a considerable extent.

Therefore various attempts were made to clarify raw Montan wax. It is true that by means of the chemical refining methods proposed for this purpose clear products can be obtained. However this result is accompanied by an undesired chemical and, in combination therewith, physical alteration of the wax so that the clear reaction product is deprived of certain other important properties forming characteristic features of raw Montan wax.

This drawback is especially found when refining raw Montan wax by distillation, whereby the valuable wax esters are split up to a considerable degree and moreover the output of refined wax is decreased.

It has been further proposed to extract raw Montan wax, preferably with the addition of a decolorizing powder such as bleaching earth, with solvents which do not or only difficultly dissolve the oxyacids contained in the wax to which acids the dark color is attributed in the first place. In fact by this method cleared wax solutions are obtained. However on distilling off the solvent from the wax the latter is, at best, obtained with a light-brown color. The bleaching effect thus obtained is not satisfactory for various applications.

Now we have found the surprising fact that the relatively slight bleaching effect obtained by this method is due to the presence of resinous constituents in the raw Montan wax and that consequently incomparably clearer products are obtained by first extracting the resins from raw Montan wax by means of decolorizing powders such as bleaching earth and especially activated carbon, and then digesting the extracted wax with solvents which do not or only difficulty dissolve the oxyacids contained in the raw wax. This property is peculiar to certain oxygenated organic solvents, such as monohydric alcohols, or their esters or ethers, for instance ethel acetate and methyl glycollate, or ketones such as butanone. Mixtures of these solvents may likewise be employed.

The invention therefore consists in extracting the resins from the raw Montan wax, then dissolving the wax in the above-named solvents, and digesting the solution with a decolorizing powder, preferably with activated carbon.

The resins may be extracted in the well-known manner with any appropriate solvent, for instance with benzene or benzine. Instead of the latter the above-named solvents may be employed. In this case the bleaching operation may immediately follow the extraction of the resins without the necessity of separating the solvent retained by the extracted wax.

For carrying out our process we may proceed as follows:—

The Montan wax obtained by extracting bituminous coal with any suitable solvent and freed from resin by any known method is dissolved in one of the above-mentioned solvents with the application of heat. The solution is mixed with the decolorizing powder whilst shaking or stirring and the stirring or shaking is continued for some time. The solution is then separated from the decolorizing powder by filtering or centrifuging. By evaporating the solvent from the filtrate, up to 80% of the Montan wax freed from resin is obtained in the form of a clarified wax of light-yellow to white color.

The consumption of decolorizing powder may be reduced and the effect of our improved method increased by carrying out the digestion of the Montan wax solution with the decolorizing agent not in one operation but stepwise. For better utilizing the decolorizing agent we may proceed according to the counter-current principle by treating the Montan wax solution, not yet subjected to the treatment, with a decolorant already used, and then digesting the solution with a fresh decolorizing agent.

The efficiency of the several decolorants varies. The best results are obtained with a highly activated carbon, for instance, "caraffin" (a carbon activated by means of zinc chloride) which for the sake of greater cheapness may be replaced by less active decolorizing carbons or earths.

The quantity of solvent required for refining the Montan wax depends upon the solubility of the wax in the respective solvent and upon the quantity and efficiency of the decolorant employed.

Instead of the Montan wax freed from resins its constituents separated in the well-known manner, for instance, the especially valuable and easily clearable wax esters, may be subjected to the bleaching operation.

To obtain products of the most valuable properties the wax solution, after being digested with the decolorant and separated from the latter by filtering, may be cooled down and the thereby separated nearly white wax portions may be separately obtained. This product equals or even surpasses carnauba wax in its chemical and physical properties, for instance with respect to its capacity for absorbing turpentine oil or with respect to its fusing point.

From the exhausted decolorizing carbon the retained Montan wax and the adsorbed and darkening constituents may be withdrawn by extraction with suitable solvents, whereupon the carbon may be regenerated by known methods, for instance, by heating in a current of carbonic acid gas, and used again.

Examples

1. Black-colored Montan wax is ground and digested with ethylacetate at room temperature to remove the resin, and the solvent is filtered off. 100 parts of this product are dissolved in 800 parts of heated ethylacetate. The resulting solution is mixed with 75 parts of carboraffin (a carbon activated by means of zinc chloride, and when slightly boiling stirred for 2 hours. Then the solution is filtered off from the decolorizing carbon and the solvent distilled off from the filtrate.

Instead of adding the 75 parts of carboraffin at once, we may also proceed in such a way that the solution is first digested with only 40 parts of carboraffin, then filtered off, then again mixed and stirred with 35 parts of carboraffin and further treated as above. In this manner a quite pure, light-yellow product is obtained. The dark portions of the wax remaining in the activated carbon are separated by extraction with benzene or the like. 78 parts of yellow Montan wax remain showing: fusing point 85° C., acid number 33, ester number 36.

2. On the one hand 100 parts of raw Montan wax and on the other hand 100 parts of Montan wax well freed from resin are dissolved in butanone under similar working conditions, and each solution is mixed with 200 parts of a mixture of carboraffin (2 parts) and decolorizing or fuller's earth (1 part). The further treatment is the same as described in Example 1. From the raw Montan wax a light-brown product is obtained; whereas the second product shows an almost pure white color.

3. The ethylacetate solution of the clarified wax obtained according to Example 1 after being filtered off from the decolorizing carbon is cooled down to 55° C. The precipitated wax is separated from the solution by means of any suitable filtering device and the remaining solvent is removed by heating. 60 parts of an almost pure white product are obtained, the properties of which—fusing point 88° C., acid number 9, ester number 45—are the same as those of carnauba wax.

The solution remaining after separating the wax portions precipitated at 55° C. is evaporated to dryness, whereby further 40 parts of a light-brown wax showing: fusing point 80° C., acid number 56 and ester number 28 are obtained.

We claim:—

1. Process for obtaining refined Montan wax which comprises extracting the resinous constituents from raw Montan wax, digesting the remaining wax, in presence of a solid adsorbent decolorizing material, with oxygenated organic solvents not easily dissolving the oxy-acids contained in the raw Montan wax, separating the resulting wax solution from the adsorbent, and separating the refined wax from the solution.

2. Process for obtaining refined Montan wax which comprises extracting the resinous constituents from raw Montan wax with oxygenated organic solvents not easily dissolving the oxy-acids contained in the raw wax, digesting the remaining wax with a further quantity of the same solvents in presence of a solid adsorbent decolorizing material, separating the resulting wax solution from the adsorbent, and separating the refined wax from the solution.

3. Process for obtaining refined Montan wax which comprises extracting the resinous constituents from raw Montan wax, stepwise digesting the remaining wax, in presence of a solid adsorbent decolorizing material, with oxygenated organic solvents not easily dissolving the oxy-acids contained in the raw Montan wax, separating the resulting wax solution from the adsorbent, and separating the refined wax from the solution.

4. Process for obtaining refined Montan wax which comprises extracting the resinous constituents from raw Montan wax with oxygenated organic solvents not easily dissolving the oxy-acids contained in the raw wax, stepwise digesting the remaining wax with a further quantity of the same solvents in presence of a solid adsorbent decolorizing material, separating the resulting wax solution from the adsorbent and separating the refined wax from the solution.

5. Process for obtaining refined Montan wax which comprises extracting the resinous constituents from raw Montan wax, digesting in counter-current the remaining wax, in presence of a solid adsorbent decolorizing material, with oxygenated organic solvents not easily dissolving the oxy-acids contained in the raw Montan wax, separating the resulting wax solution from the adsorbent, and separating the refined wax from the solution.

6. Process for obtaining refined Montan wax which comprises extracting the resinous constituents from raw Montan wax, digesting the remaining wax, in presence of a highly activated carbon, with oxygenated organic solvents not easily dissolving the oxy-acids contained in the raw Montan wax, separating the resulting wax solution from the adsorbent, and separating the refined wax from the solution.

7. Process for obtaining refined Montan wax which comprises extracting the resinous constituents from raw Montan wax, digesting the remaining wax, in presence of a carbon activated by means of zinc chloride with oxygenated organic solvents not easily dissolving the oxy-acids contained in the raw Montan wax, separating the resulting wax solution from the adsorbent, and separating the refined wax from the solution.

8. Process for obtaining refined Montan wax which comprises extracting the resinous constituents from raw Montan wax, heating the remaining wax, in presence of a solid adsorbent decolorizing material, with oxygenated organic solvents not easily dissolving the oxy-acids contained in the raw Montan wax, filtering off the resulting solution, cooling the said solution, separating the precipitated wax from the solution, and separating the wax from the latter.

9. Process for obtaining refined Montan wax which comprises extracting the resinous constituents from raw Montan wax, digesting the remaining wax, in presence of a solid adsorbent decolorizing material, with ethyl acetate, separating the resulting wax solution from the adsorbent, and separating the refined wax from the resulting solution.

10. Process for obtaining refined Montan wax which comprises extracting the resinous constituents from raw Montan wax, digesting the remaining wax, in presence of a solid adsorbent decolorizing material, with oxygenated organic solvents not easily dissolving the oxy-acids contained in the raw Montan wax, separating the resulting wax solution from the adsorbent, extracting the exhausted decolorant with a solvent capable of dissolving the whole of the wax constituents contained therein, and separating the refined wax and the extracted oxy-acids from the resulting solutions.

11. Process for obtaining refined Montan wax which comprises extracting the resinous constituents from raw Montan wax, digesting the remaining wax, in presence of a solid adsorbent decolorizing material, with oxygenated organic solvents not easily dissolving the oxy-acids contained in the raw Montan wax, separating the resulting wax solution from the adsorbent, extracting the exhausted decolorant with benzene, and separating the dissolved material from the resulting solutions.

In testimony whereof we affix our signatures.

FRITZ ZSCHOCH.
HERBERT RODRIAN.